United States Patent
Yakos et al.

(10) Patent No.: US 11,976,742 B1
(45) Date of Patent: May 7, 2024

(54) ELECTROMAGNETICALLY ACTIVATED PIPE VALVE

(71) Applicant: MagDrive Technologies, Inc., Bozeman, MT (US)

(72) Inventors: David Yakos, Bozeman, MT (US); Stephen Sanford, Bozeman, MT (US); Robert K. Burgess, Sheridan, WY (US)

(73) Assignee: MAGDRIVE TECHNOLOGIES, INC., Bozeman, MT (US)

( * ) Notice: Subject to any disclaimer, the term of this patent is extended or adjusted under 35 U.S.C. 154(b) by 0 days.

(21) Appl. No.: 18/096,383

(22) Filed: Jan. 12, 2023

(51) Int. Cl.
*F16K 31/04* (2006.01)
*F16K 5/06* (2006.01)

(52) U.S. Cl.
CPC .......... *F16K 31/043* (2013.01); *F16K 5/0647* (2013.01)

(58) Field of Classification Search
CPC .... F16K 31/043; F16K 31/041; F16K 31/042; F16K 31/082; F16K 5/0647
See application file for complete search history.

(56) References Cited

U.S. PATENT DOCUMENTS

| | | | | |
|---|---|---|---|---|
| 2,756,370 A * | 7/1956 | Meusy | ................... | F16K 31/041 335/238 |
| 2,951,189 A * | 8/1960 | Hajny | ................... | F16K 31/041 335/266 |
| 4,561,629 A * | 12/1985 | Idogaki | ................. | F16K 31/082 251/129.1 |
| 4,789,132 A * | 12/1988 | Fujita | ...................... | F16K 31/04 137/219 |
| 5,083,744 A * | 1/1992 | Oliver | ................... | F16K 31/041 137/554 |
| 5,146,126 A * | 9/1992 | Hutchins | ............... | F16K 31/041 310/91 |
| 5,690,144 A * | 11/1997 | Takahashi | ............... | F25B 41/26 251/59 |
| 6,460,567 B1 * | 10/2002 | Hansen, III | ............. | F16K 31/04 137/625.48 |
| 6,848,401 B2 | 2/2005 | Takenaka et al. | | |
| 6,865,900 B2 * | 3/2005 | Ozawa | ................... | F16K 31/535 62/442 |
| 7,325,780 B2 | 2/2008 | Arai et al. | | |
| 7,971,855 B2 | 7/2011 | Burgess et al. | | |
| 8,496,228 B2 | 7/2013 | Burgess et al. | | |
| 9,139,986 B2 * | 9/2015 | Smith | ..................... | E03C 1/025 |
| 9,377,121 B2 * | 6/2016 | Burgess | .................. | F16K 31/54 |

(Continued)

FOREIGN PATENT DOCUMENTS

WO    WO-2021122547 A1 *    6/2021    ................ F01P 5/12

*Primary Examiner* — Umashankar Venkatesan
(74) *Attorney, Agent, or Firm* — NEO IP

(57) ABSTRACT

The present invention is directed to an electromagnetic actuation system for opening and closing pipe valves. The electromagnetic actuation systems utilizes one or more electromagnets surrounding one or more permanent magnets attached to a rotary shaft of the valve mechanism. A controller activates the one or more electromagnets such that the produced magnetic field rotates, thereby applying a force to the one or more permanent magnets and thus rotating the rotary shaft. The system does not require rotation of the one or more electromagnets relative to the one or more permanent magnets, advantageously reducing the number of moving parts within the valve system.

16 Claims, 13 Drawing Sheets

(56) References Cited

U.S. PATENT DOCUMENTS

| | | | | |
|---|---|---|---|---|
| 9,797,521 B1* | 10/2017 | Davis | .................. | F16K 3/12 |
| 9,946,271 B2* | 4/2018 | Tuineag | .................. | F16K 3/06 |
| 10,151,403 B2* | 12/2018 | Davis | .................. | F16K 31/048 |
| 10,221,959 B1 | 3/2019 | Davis | | |
| 10,731,770 B2 | 8/2020 | Kawase et al. | | |
| 10,781,932 B2* | 9/2020 | Yokoe | .................. | F16K 31/535 |
| 11,047,498 B2* | 6/2021 | Decker | .................. | F16K 31/04 |
| 11,047,499 B2* | 6/2021 | Davis | .................. | F16K 31/05 |
| 11,131,397 B2* | 9/2021 | Yan | .................. | B21K 1/20 |
| 11,156,306 B2* | 10/2021 | Yokoe | .................. | H02K 1/30 |
| 11,329,531 B2* | 5/2022 | Billet | .................. | H02K 7/14 |
| 11,339,876 B2* | 5/2022 | Nishimura | .................. | F16K 1/2265 |
| 2008/0073606 A1* | 3/2008 | Liantonio | .................. | F16K 31/086 |
| | | | | 251/65 |
| 2013/0140476 A1* | 6/2013 | Burgess | .................. | F16K 31/088 |
| | | | | 251/248 |
| 2022/0178459 A1* | 6/2022 | Davis | .................. | F16K 31/088 |
| 2022/0228671 A1* | 7/2022 | Wu | .................. | F16K 5/0689 |
| 2022/0316618 A1* | 10/2022 | Billet | .................. | F16K 31/04 |

\* cited by examiner

ELECTROMAGNETICALLY ACTIVATED PIPE VALVE

BACKGROUND OF THE INVENTION

1. Field of the Invention

The present invention relates to valves especially designed for gas and petroleum lines, and more specifically to electromagnetically operated valves.

2. Description of the Prior Art

It is generally known in the prior art to provide valves for permitting or blocking flow through pipes, including valves using physically rotating magnetic actuation systems.

Prior art patent documents include the following:

U.S. Pat. No. 6,460,567 for Sealed motor driven valve by inventors Hansen et al., filed Nov. 24, 1999 and issued Oct. 8, 2002, discloses a motor operated valve including a valve body with an inlet and outlet and a valve seat therebetween. A valve core reciprocates between open and closed positions by threads of the valve core cooperating with threads on a shaft which rotates with the armature of the motor. The armature has a plurality of spaced apart permanent magnets, a bearing assembly, and is enclosed by a magnetically transparent enclosure closed at one end and hermetically sealed at its other end to the valve body. Lying closely outside the enclosure is a drive stator that includes drive windings and plural Hall-effect devices for commutation of the windings.

U.S. Pat. No. 10,731,770 for Electric flow control valve and actuator by inventors Kawase et al., filed Jul. 7, 2016 and issued Aug. 4, 2020, discloses an actuator including a rod, an electric motor to generate a rotational driving force on supply of electricity, an output shaft to output the rotational driving force of the electric motor to the rod, a feed screw mechanism, and a rotation prevention mechanism. The feed screw mechanism includes a female screw portion formed on one of the output shaft and the rod, and a male screw portion formed on the other to mesh with the female screw portion. The rotation prevention mechanism is configured to regulate rotation of the rod caused by the rotational driving force of the electric motor.

U.S. Pat. No. 7,325,780 for Motor operated valve with reduction gear by inventors Arai et al., filed Dec. 9, 2005 and issued Feb. 5, 2008, discloses a small-sized motor operated valve that has high output and high resolution by housing a reduction gear together with a rotor in a single can. A valve shaft having a valve member is inserted to a motor operated valve body. A rotor is disposed inside a can attached to the body, and inside the rotor is housed a reduction gear. The output of the rotor is input to a sun gear and transmitted to planetary gears. The planetary gears are engaged both with the fixed gear and the output gear, and the output gear is driven at reduced speed by a large reduction ratio. The output of the output gear is transmitted via a driver to a screw shaft, where it is converted into a linear movement and transmitted to the valve shaft.

U.S. Pat. No. 10,221,959 for Higher speed lower torque magnetic valve actuator by inventor Davis, filed Oct. 3, 2018 and issued Mar. 5, 2019, discloses various devices and techniques related to magnetically-actuated valves. In some examples, magnetically-actuated valves may include mechanisms to provide mechanical advantage such that the torques or forces applied to the valve member are higher than the torques or forces transmitted across the sealed valve enclosure by the magnetic coupling. In some examples, valves may employ mechanisms coupled to the external actuator with inverse mechanical advantage that better match traditional or convenient actuation rates of other valves.

U.S. Pat. No. 8,496,228 for Planetary gear ball valve by inventors Burgess et al., filed Jan. 28, 2012 and issued Jul. 30, 2013, discloses a stemless ball valve comprising a first flange, second flange, ball, inner magnetic cartridge, outer magnetic cartridge, and planetary gear assembly. The inner magnetic cartridge is situated inside of the outer magnetic cartridge, and the inner and outer magnetic cartridges actuate the valve. The planetary gear assembly is situated between the inner magnetic cartridge and the ball. The planetary gear assembly comprises one or more planetary gear phases, each planetary gear phase comprising a step-down gear. Each planetary gear phase comprises one or more planetary gears that engage with the inner teeth of the outer ring of the planetary gear assembly and with a step-down gear. The invention further comprises a pressure equalization system comprising inner and outer equalization tubes, a piston situated between the inner and outer equalization tubes, and either a piston spring or spring washer stack that biases the piston in the direction of the clean oil.

U.S. Pat. No. 9,377,121 for Leak-free rotary valve with internal worm gear by inventors Burgess et al., filed Nov. 18, 2012 and issued Jun. 28, 2016, discloses a rotary valve assembly composing a leak-free enclosure containing a worm gear and a pinion gear, an adapter plate that is situated between a rotary valve body and the enclosure and that secures the rotary valve body to the enclosure, and a magnetic actuator assembly. The worm gear engages with the pinion gear such that when the worm gear rotates, the pinion gear rotates as well. The enclosure is situated between the magnetic actuator assembly and the rotary valve body. A shaft extends through the center of the pinion gear and causes a valve within the rotary valve body to open and close based on rotation of the shaft. In an alternate embodiment, the invention is a rotary valve as described above with an integral adapter plate.

U.S. Pat. No. 7,971,855 for Stemless ball valve by inventors Burgess et al., filed Dec. 9, 2008 and issued Jul. 5, 2011, discloses a stemless ball valve comprising two flanges and a ball with a channel, two axis pins and two travel pins. One end of each axis and travel pin is fixedly attached to the ball, and the other end of each axis pin is lodged into a notch in the first or second flange such that the axis pin is allowed to rotate in the notch. The guide sleeve comprises two channels, and one end of each travel pin is situated within one of the two channels in the guide sleeve. An outer magnetic cartridge causes the inner magnetic cartridge and guide sleeve to rotate, and when the guide sleeve rotates, the travel pins move up and down within the channels in the guide sleeve. The movement of the travel pins within the channels in the guide sleeve causes the ball to rotate, thereby opening and closing the ball valve.

U.S. Pat. No. 6,848,401 for Valve timing adjusting device by inventors Takenaka et al., filed Apr. 21, 2003 and issued Feb. 1, 2005, discloses a valve timing adjusting device adjusting valve timing by shifting rotational phase of a camshaft relative to a crankshaft. The device has an electric motor for rotating a rotor member that drives and moves a phase defining member to a required position. The phase defining member defines the rotational phase of the camshaft in accordance with the position itself. The phase defining member may be a planetary gear rotatably supported on an eccentric shaft as the rotor member. The planetary gear works as both a reduction mechanism and a phase shifting mechanism. The phase defining member may be a control pin slidably supported on a rotatable member as the rotor member. A planetary gear may be additionally used as the reduction mechanism for rotating the rotatable member. It is possible to control the phase with high accuracy and durability.

SUMMARY OF THE INVENTION

The present invention relates to valves especially designed for gas and petroleum lines, and more specifically to electromagnetically operated valves.

It is an object of this invention to electromagnetically actuate a valve mechanism without requiring the mechanism to rotate a first set of magnets around a second set of magnets.

In one embodiment, the present invention is directed to an electromagnetically actuated valve system, including at least one valve blocking mechanism positioned within a pipe, wherein, in an open position, the at least one valve blocking mechanism substantially allows fluid flow through the pipe, and wherein, in a closed position, the at least one valve blocking mechanism substantially prohibits fluid through the pipe, at least one rotary shaft mechanically coupled with the at least one valve blocking mechanism, such that rotation of the at least one rotary shaft causes the at least one valve blocking mechanism to change between the open position, the closed position, and one or more semi-open positions between the open position and the closed position, one or more permanent magnets attached to at least one end of the at least one rotary shaft, a valve housing sealingly enclosing the at least one valve blocking mechanism, the at least one rotary shaft, and the one or more permanent magnets, wherein the valve housing includes at least one magnetic containment chamber surrounding the one or more permanent magnets, at least one electromagnet connected to an external surface of the at least one magnetic containment chamber, and a controller electrically connected to the at least one electromagnet, wherein the controller alternates the at least one valve blocking mechanism between the open position, the closed position, and the one or more semi-open positions by activating the at least one electromagnet.

In another embodiment, the present invention is directed to an electromagnetically actuated valve system, including at least one valve blocking mechanism positioned within a pipe, wherein, in an open position, the at least one valve blocking mechanism substantially allows fluid flow through the pipe, and wherein, in a closed position, the at least one valve blocking mechanism substantially prohibits fluid through the pipe, at least one rotary shaft mechanically coupled with the at least one valve blocking mechanism, such that rotation of the at least one rotary shaft causes the at least one valve blocking mechanism to change between the open position, the closed position, and one or more semi-open positions between the open position and the closed position, one or more permanent magnets attached to at least one end of the at least one rotary shaft, at least one magnetic containment chamber surrounding the at least one rotary shaft and the one or more permanent magnets attached to the at least one rotary shaft, at least one electromagnet connected to an external surface of the at least one magnetic containment chamber, and a controller electrically connected to the at least one electromagnet, wherein the controller alternates the at least one valve blocking mechanism between the open position, the closed position, and the one or more semi-open positions by activating the at least one electromagnet, and wherein the at least one magnetic containment chamber is formed from at least one substantially non-ferromagnetic material.

In yet another embodiment, the present invention is directed to an electromagnetically actuated valve system, including at least one valve blocking mechanism positioned within a pipe, wherein, in an open position, the at least one valve blocking mechanism substantially allows fluid flow through the pipe, and wherein, in a closed position, the at least one valve blocking mechanism substantially prohibits fluid through the pipe, at least one rotary shaft mechanically coupled with the at least one valve blocking mechanism, such that rotation of the at least one rotary shaft causes the at least one valve blocking mechanism to change between the open position, the closed position, and one or more semi-open positions between the open position and the closed position, one or more permanent magnets attached to at least one end of the at least one rotary shaft, at least one magnetic containment chamber surrounding the at least one rotary shaft and the one or more permanent magnets attached to the at least one rotary shaft, a plurality of electromagnets connected to an external surface of the at least one magnetic containment chamber, and a controller electrically connected to the plurality of electromagnets, wherein the controller alternates the at least one valve blocking mechanism between the open position, the closed position, and the one or more semi-open positions by activating the at least one electromagnet by sequentially activating one or more of the plurality of electromagnets.

These and other aspects of the present invention will become apparent to those skilled in the art after a reading of the following description of the preferred embodiment when considered with the drawings, as they support the claimed invention.

DETAILED DESCRIPTION

Figure 1:
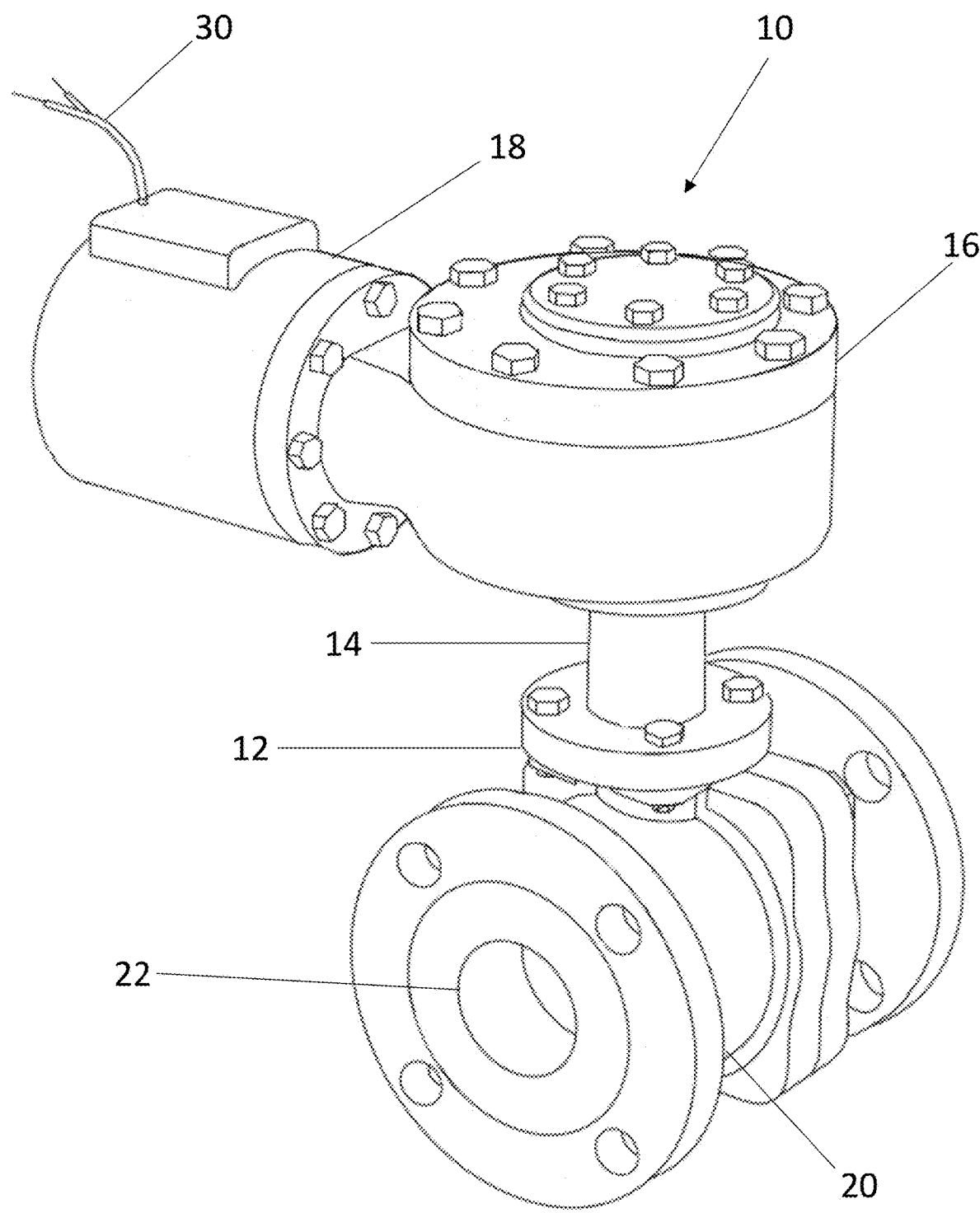
FIG. 1 illustrates an isometric view of an electromagnetic valve according to one embodiment of the present invention.

The present invention is generally directed to valves especially designed for gas and petroleum lines, and more specifically to electromagnetically operated valves.

In one embodiment, the present invention is directed to an electromagnetically actuated valve system, including at least one valve blocking mechanism positioned within a pipe, wherein, in an open position, the at least one valve blocking mechanism substantially allows fluid flow through the pipe, and wherein, in a closed position, the at least one valve blocking mechanism substantially prohibits fluid through the pipe, at least one rotary shaft mechanically coupled with the at least one valve blocking mechanism, such that rotation of the at least one rotary shaft causes the at least one valve blocking mechanism to change between the open position, the closed position, and one or more semi-open positions between the open position and the closed position, one or more permanent magnets attached to at least one end of the at least one rotary shaft, a valve housing sealingly enclosing the at least one valve blocking mechanism, the at least one rotary shaft, and the one or more permanent magnets, wherein the valve housing includes at least one magnetic containment chamber surrounding the one or more permanent magnets, at least one electromagnet connected to an external surface of the at least one magnetic containment chamber, and a controller electrically connected to the at least one electromagnet, wherein the controller alternates the at least one valve blocking mechanism between the open position, the closed position, and the one or more semi-open positions by activating the at least one electromagnet.

In another embodiment, the present invention is directed to an electromagnetically actuated valve system, including at least one valve blocking mechanism positioned within a pipe, wherein, in an open position, the at least one valve blocking mechanism substantially allows fluid flow through the pipe, and wherein, in a closed position, the at least one valve blocking mechanism substantially prohibits fluid through the pipe, at least one rotary shaft mechanically coupled with the at least one valve blocking mechanism, such that rotation of the at least one rotary shaft causes the at least one valve blocking mechanism to change between the open position, the closed position, and one or more semi-open positions between the open position and the closed position, one or more permanent magnets attached to at least one end of the at least one rotary shaft, at least one magnetic containment chamber surrounding the at least one rotary shaft and the one or more permanent magnets attached to the at least one rotary shaft, at least one electromagnet connected to an external surface of the at least one magnetic containment chamber, and a controller electrically connected to the at least one electromagnet, wherein the controller alternates the at least one valve blocking mechanism between the open position, the closed position, and the one or more semi-open positions by activating the at least one electromagnet, and wherein the at least one magnetic containment chamber is formed from at least one substantially non-ferromagnetic material.

In yet another embodiment, the present invention is directed to an electromagnetically actuated valve system, including at least one valve blocking mechanism positioned within a pipe, wherein, in an open position, the at least one valve blocking mechanism substantially allows fluid flow through the pipe, and wherein, in a closed position, the at least one valve blocking mechanism substantially prohibits fluid through the pipe, at least one rotary shaft mechanically coupled with the at least one valve blocking mechanism, such that rotation of the at least one rotary shaft causes the at least one valve blocking mechanism to change between the open position, the closed position, and one or more semi-open positions between the open position and the closed position, one or more permanent magnets attached to at least one end of the at least one rotary shaft, at least one magnetic containment chamber surrounding the at least one rotary shaft and the one or more permanent magnets attached to the at least one rotary shaft, a plurality of electromagnets connected to an external surface of the at least one magnetic containment chamber, and a controller electrically connected to the plurality of electromagnets, wherein the controller alternates the at least one valve blocking mechanism between the open position, the closed position, and the one or more semi-open positions by activating the at least one electromagnet by sequentially activating one or more of the plurality of electromagnets.

In order to prevent leakage of potentially harmful fluids, it is important that many pipelines (e.g., oil and gas pipelines, pipelines holding noxious chemicals, cryogenic hydrogen or helium pipelines) remain fully sealed. Preventing leakage requires reliable valve mechanisms that both allow an operator to halt flow of fluid through the pipeline and which prevent leakage of the fluid through the valve mechanism.

At the point where current valves are attached to a pipe, typically a stem is attached to a valve mechanism within the pipe (e.g., gate valve, globe valve, plug valve, ball valve, butterfly valve, needle valve, etc.). A handle is then attached to the stem such that an operator is able to turn the handle in order to open or close the valve. In order to prevent fluid flowing within the pipe from leaking, it is required to tightly seal the area where the stem rises through the side wall of the pipe. Typically, seals, sometimes called packing, take the form of gaskets, or O-rings, surrounding the stem of the valve. However, especially in high pressure situation as with oil and natural gas pipelines, these O-rings tend to fail over time and begin to allow some leakage. Occasionally, these leaks are catastrophic and cause fluid loss and frequently causing environmental damage and health care risks. Therefore, a more reliable method is needed to prevent fluid leakage from valves.

Solenoid valves are known in the art. Solenoid valves use an electromagnet (e.g., the solenoid) surrounding a movable permanent magnetic (e.g., ferromagnetic) core, where activation of the solenoid by application of electric current causes the permanent ferromagnetic core to move, thereby opening or close the valve. However, a fault of current solenoidal valves is that most lack the ability to apply sufficient torque in order to be used in larger, higher pressure pipelines, such as oil and natural gas pipelines.

Previous inventions, such as U.S. Pat. No. 8,496,228, have used magnetic means for turning valves, including quarter-turn valves, such as U.S. Pat. No. 9,377,121, planetary gear ball valves, such as described in U.S. Pat. No. 8,496,228, and rising stem valves, such as described in U.S. Pat. No. 9,702,469. However, each of these prior art inventions have required physical rotation (either manually or automatically by means of a controller) of an outer shell including a plurality of electromagnets relative to an inner shell of permanent magnets attached to a valve shaft. However, systems that require physical rotation are not always preferred. Physical rotation, for example, gradually causes wear in the interface between rotating components. Furthermore, physical rotation typically requires more space for the component to able to move, not allowing other components to be tightly packed against the rotating component. Therefore, for some instances, a system for electromagnetically actuating a valve without physical rotation of the components is needed.

Additionally, some previous systems that have incorporated magnetic actuation systems, in valves or in other fields, include only an outer magnetic mechanism, but not an internal magnetic coupled with the stem, leading to lower torque.

Referring now to the drawings in general, the illustrations are for the purpose of describing one or more preferred embodiments of the invention and are not intended to limit the invention thereto.

FIG. 1 illustrates an isometric view of an electromagnetic valve according to one embodiment of the present invention. An electromagnetic valve 10 is configured to be attached to a pipe 20 through which water, oil, or other fluids flow through a central channel 22. The electromagnetic valve 10 connects to the pipe 20 at an interface 12 and includes a stem 14 rising outwardly from the pipe 20. In one embodiment, the stem 14 extends outwardly from pipe 20 in a direction substantially orthogonal to a central axis of the pipe 20. A bottom end of the stem 14 is connected to the interface 12 between the pipe 20 and the electromagnetic valve 10 and a top end of the stem 14 is connected to a central housing 16. A magnetic element housing 18 extends outwardly from at least one side wall of the central housing 16. In one embodiment, at least one side wall of the magnetic element housing 18 are integrally formed with the at least one side wall of the central housing 16. In one embodiment, the magnetic element housing 18 extends outwardly from the central housing 16 in a direction substantially orthogonal to a central axis of the stem 14 and substantially orthogonal to the central axis of the pipe 20. In another embodiment, the magnetic element housing 18 extends outwardly from the central housing 16 in a direction substantially orthogonal to the central axis of the stem 14, but substantially parallel to the central axis of the pipe 20. One or more wires 30 lead out of the magnetic element housing 18 (in which they are connected to at least one electromagnet) and are connected to a controller (not shown in FIG. 1) capable of sending electric signals to the electromagnetic valve 10.

Figure 2:
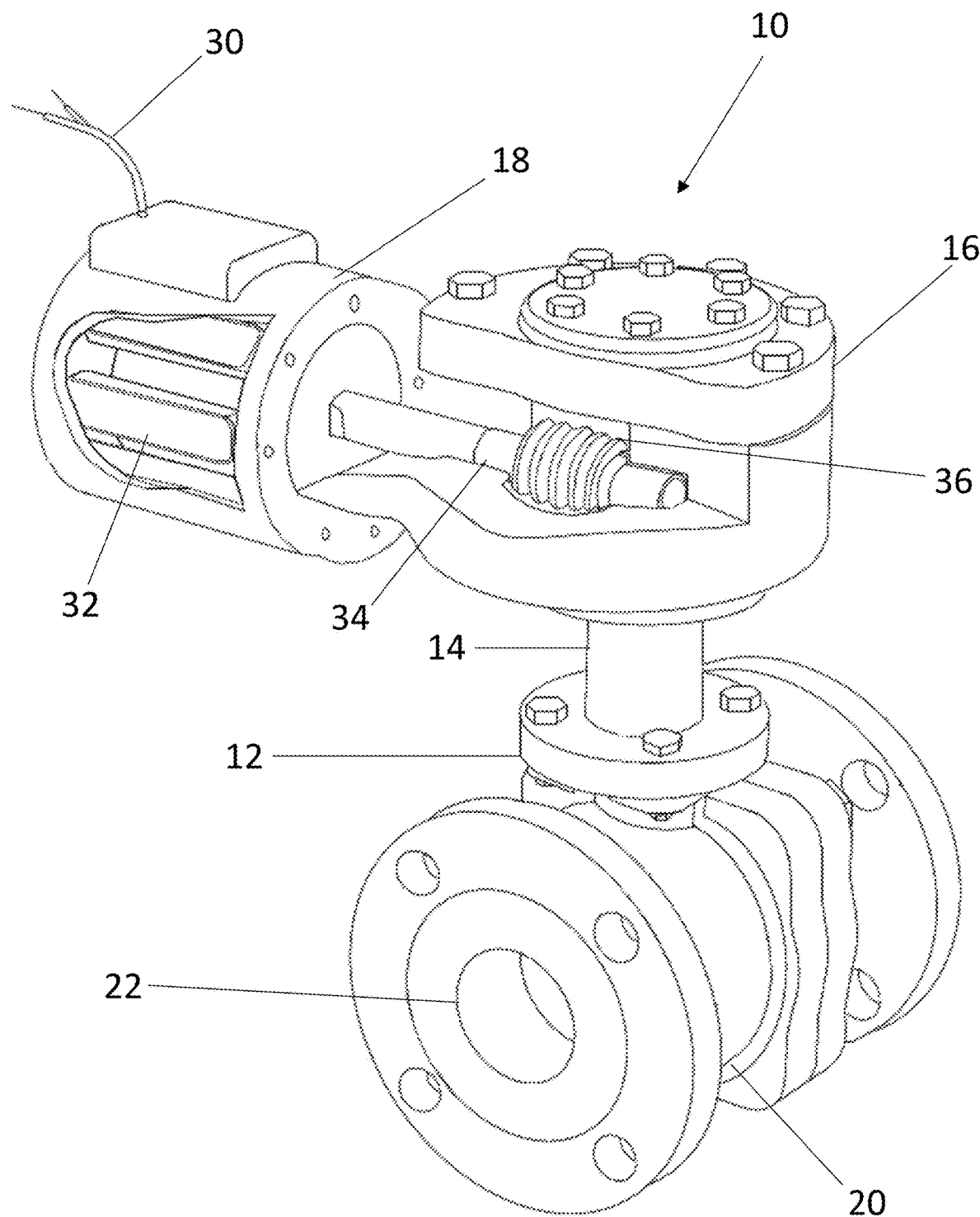
FIG. 2 illustrates an isometric view of an electromagnetic valve with an external section of the valve removed, providing a view of internal components according to one embodiment of the present invention.
Figure 3:
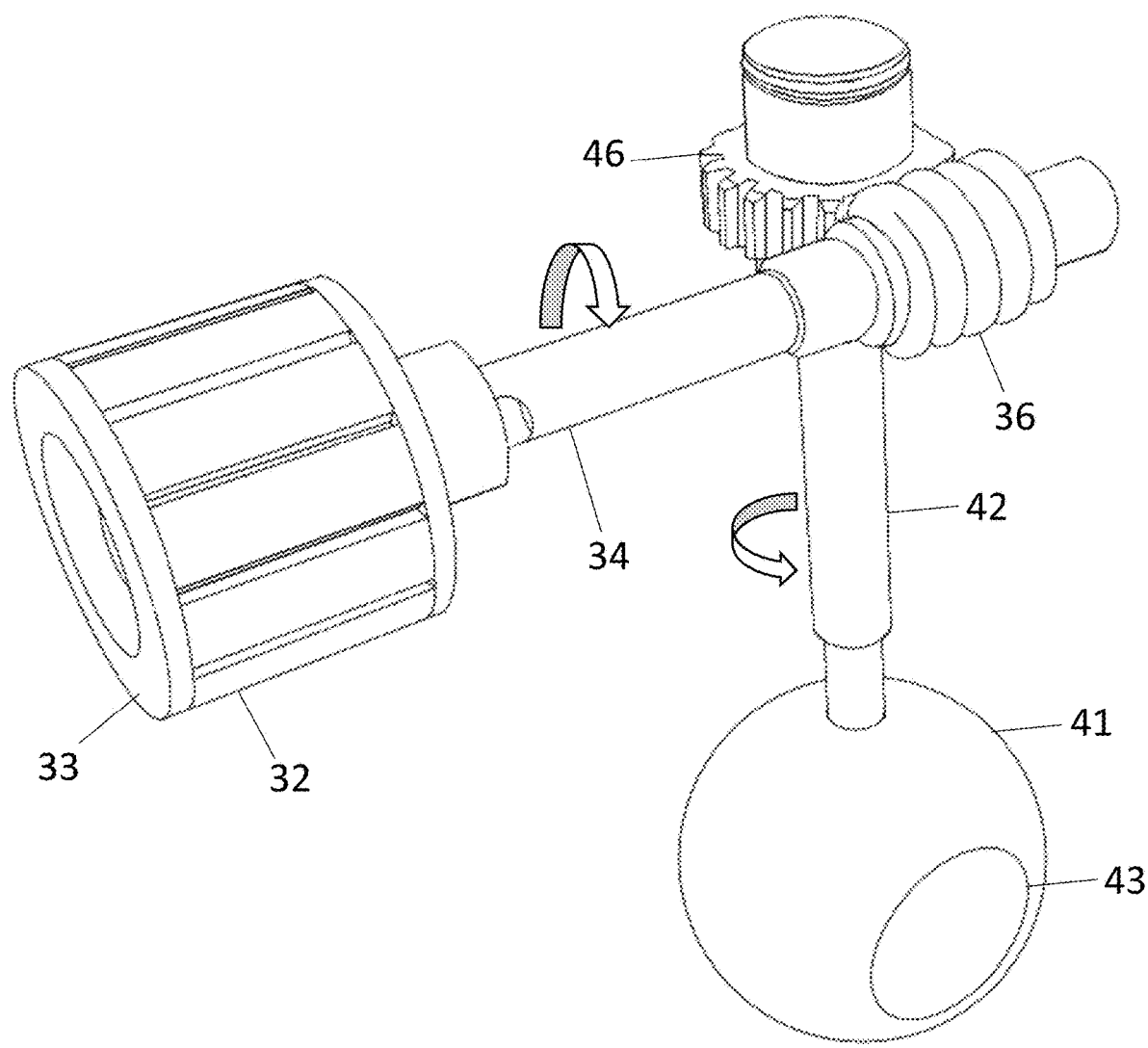
FIG. 3 illustrates a transparent view of internal components of an electromagnetic valve according to one embodiment of the present invention.

FIG. 2 illustrates an isometric view of an electromagnetic valve with an external section of the valve removed, providing a view of internal components according to one embodiment of the present invention. The magnetic element housing 18 of the electromagnetic valve 10 houses a plurality of permanent magnets surrounding a central shaft 34, surrounded by a cylindrically sealed container. In one embodiment, the cylindrically sealed container is integral with the central housing 16 of the electromagnetic valve. One or more electromagnets 32 surround the cylindrically sealed container. In one embodiment, the one or more electromagnets 32 include one or more electromagnetic coils wrapped around or positioned adjacent to the exterior cylindrically sealed container.

Upon activation of the one or more electromagnets 32 by an electrical signal travelling through the one or more wires 30 to the one or more electromagnets 32, the one or more electromagnets 32 create a magnetic force on the plurality of permanent magnets, causing the central shaft 34 to rotate. Importantly, the system rotates the plurality of permanent magnets by altering which of the one or more electromagnets 32 are activated over time (or which segments of the one or more electromagnets 32 are activated over time), such that the magnetic field is rotated. In this way, the system does not require the electromagnets 32 to physically rotate relative to the permanent magnets, unlike prior systems such as that described in U.S. Pat. No. 9,377,121. In one embodiment, at least one portion of the central shaft 34 includes a plurality of teeth or a plurality of ridges 36 configured to matingly engage with a plurality of teeth or a plurality of ridges connected to a second shaft extending through the stem 14. When the central shaft 34 begins to rotate, the plurality of teeth or plurality of ridges on the central shaft 34 engage with the plurality of teeth or plurality of ridges connected to the second shaft, causing the second shaft to also rotate. The second shaft is connected to a valve element within the pipe 20, which permits or forbids fluid from flowing through the pipe 20. Rotation of the second shaft causes the valve element to change positions between an open state and a closed state and therefore activation of the one or more electromagnets 32 causes the valve element to open or close. In one embodiment, the electromagnetic motor is a stator motor, a stepper motor, or the like.

Figure 4:
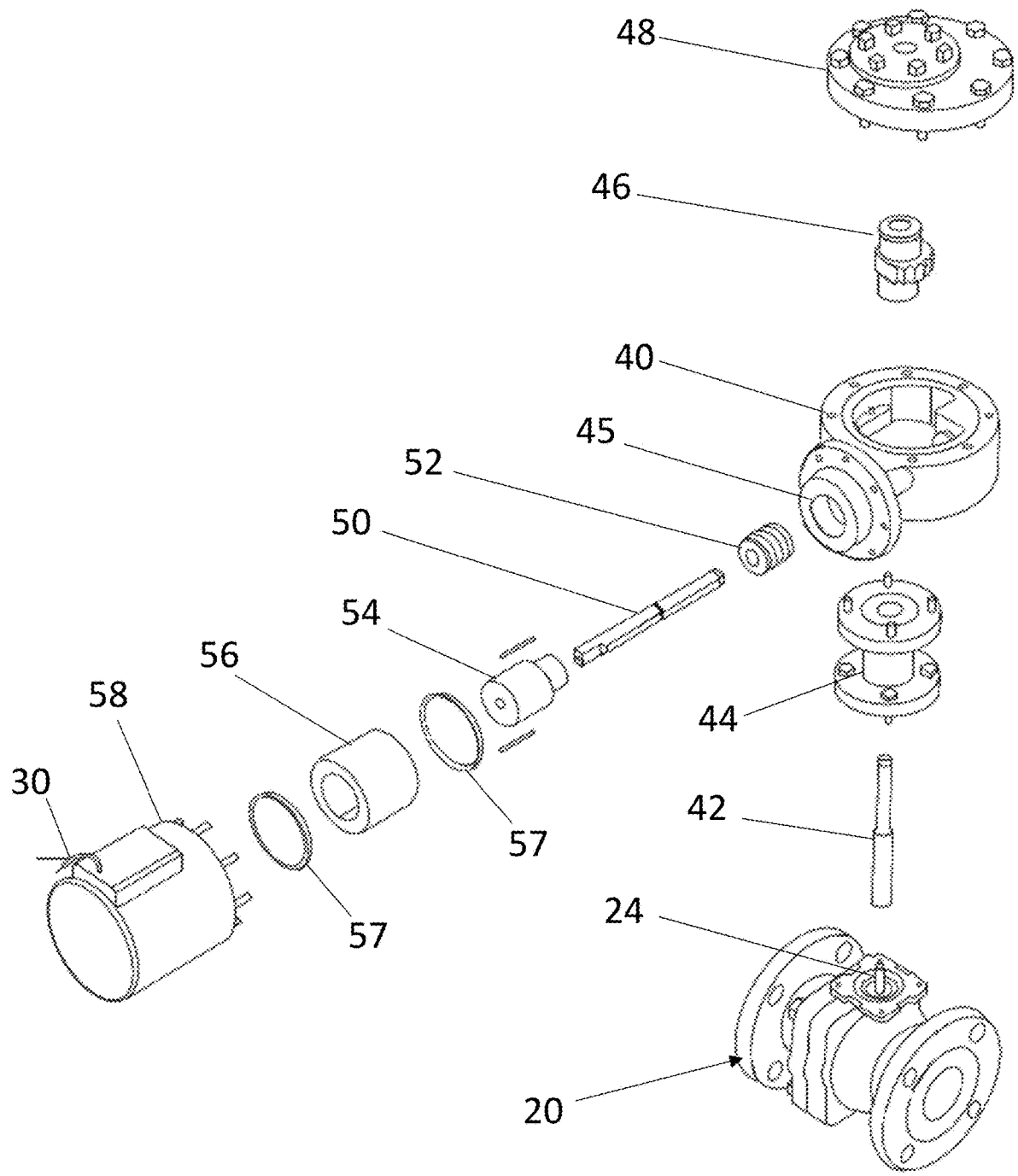
FIG. 4 illustrates an isometric exploded view of an electromagnetic valve according to one embodiment of the present invention.

FIG. 4 illustrates an isometric exploded view of an electromagnetic valve according to one embodiment of the present invention. A pipe 20 includes an interface 24 configured to attach to a central shaft 42 rising upwardly from the pipe 20 and a stem housing 44 surrounding the central shaft 42. In one embodiment, the interface 24 includes a protrusion connected to a valve element within the pipe 20, wherein rotation of the protrusion causes the valve element to open, allowing fluid through the pipe 20, or close, preventing the flow of fluid within the pipe 20. In one embodiment, the bottom of the central shaft 42 includes an opening configured to receive and frictionally engage with the protrusion, such that the protrusion and the central shaft 42 are rotationally coupled. In one embodiment, the stem housing 44 is connected to the interface 24 via one or more bolts, one or more screws, metal welding, and/or any other suitable form of fastener or bonding technique.

The central shaft 42 extends through the stem housing 44 into the central housing 40. The top of the central housing 40 is sealed by a lid 48. In one embodiment, the lid 48 is attached to the central housing 40 via one or more bolts, one or more screws, welding, and/or any other suitable form of fastener or bonding technique. In one embodiment, the central shaft 42 is configured to frictionally engage a central bore of a gear engagement element 46, rotationally coupling the central shaft 42 to the gear engagement element 46. A plurality of gear teeth or ridges extend outwardly from a side wall of the gear engagement element 46. In another embodiment, gear teeth or ridges extend directly from a side wall of the central shaft 42 and no separate gear engagement element 46 is used.

The central housing 40 includes a side port 45 through which a side shaft 50 extends. In one embodiment, the side shaft 50 is frictionally engaged with a central bore of a second gear engagement element 52. A plurality of gear teeth or ridges extend outwardly from a side wall of the second gear engagement element 52. In another embodiment, gear teeth or ridges extend directly from a side wall of the side shaft 50 and no separate second gear engagement element 52 is used. The gear teeth or ridges of the side shaft 50 are configured to engage with the gear teeth or ridges of the central shaft 42, such that rotation of the side shaft 50 causes rotation of the central shaft 42. An end of the side shaft 50 opposite the end including the plurality of gear teeth or ridges is surrounding by a plurality of permanent magnets. This end of the side shaft 50 and the plurality of permanent magnets are nested within a sealed cylindrical compartment 54. In one embodiment, the sealed cylindrical compartment 54 includes a single opening, configured to receive the end of the side shift 50. At least a section of the sealed cylindrical compartment 54 is configured to matingly fit within the side port 45 of the central housing 40. In one embodiment, the outer wall of the section of the sealed cylindrical compartment 54 frictionally engages with the inner wall of the side port 45 of the central housing 40. In one embodiment, a seal (e.g., an O-ring) is fitted between the sealed cylindrical compartment 54 and the inner wall of the side port 45. However, importantly, even if there is leakage between the central housing 40 and the sealed cylindrical compartment 54, there is no potential fluid path outside of the sealed cylindrical compartment 54 and the central housing 40.

At least one electromagnet surrounds the sealed cylindrical compartment 54 and both the at least one electromagnet and the sealed cylindrical compartment 54 are nested within a magnetic housing 58. In one embodiment, the magnetic housing 58 is a substantially hollow, cylindrical component including a single opening configured to receive the at least one electromagnet and the sealed cylindrical compartment 54. In one embodiment, the magnetic housing 58 is configured to tightly attach to a rim surrounding the side port 45 of the central housing 40. In one embodiment, the magnetic housing 58 is attached to the rim surrounding the side port 45 by at least one bolt, at least one screw, welding, and/or any other suitable form of fastener or permanent bonding technique. In another embodiment, the magnetic housing 58 includes a plurality of protrusions extending longitudinally outwardly in a rim surrounding the opening of the magnetic housing 58. In yet another embodiment, the system does not include a magnetic housing 58, but rather the electromagnetic coils are directly attached to the exterior of the sealed cylindrical component 54, but are not themselves enclosed. This embodiment is not possible in prior art systems, such as in U.S. Pat. No. 9,377,121, as the '121 patent requires the magnetic housing to attach to permanent magnets, whose rotation causes rotation of the magnetic field that actuates the valve. Thus, the magnetic housing in prior art systems is required to actually actuate the valve.

The plurality of protrusions are configured to matingly fit within a plurality of openings in the rim surrounding the side port 45 and frictionally engage with the plurality of openings. A plurality of wires 30 are connected to the electromagnets within the magnetic housing 58 so as to be able to deliver electric signals to individual electromagnets, such that the magnetic field is able to be rotated to actuate the valve.

In one embodiment, the magnetic housing 58 is formed from stainless steel, fiber-reinforced plastic, or another non-magnetic (e.g., diamagnetic) material suitable for use as a pressure vessel. In one embodiment, other components of the electromagnetic valve, such as the central housing 40, the sealed cylindrical compartment 54, the stem housing 44, and/or the central shaft 42, are also formed from non-magnetic materials. Utilizing non-magnetic materials is used in ensuring that the at least one electromagnet does not face interference in the process of applying a magnetic force to the plurality of permanent magnets, thereby increasing efficiency and reliability of the valve.

Figure 5:
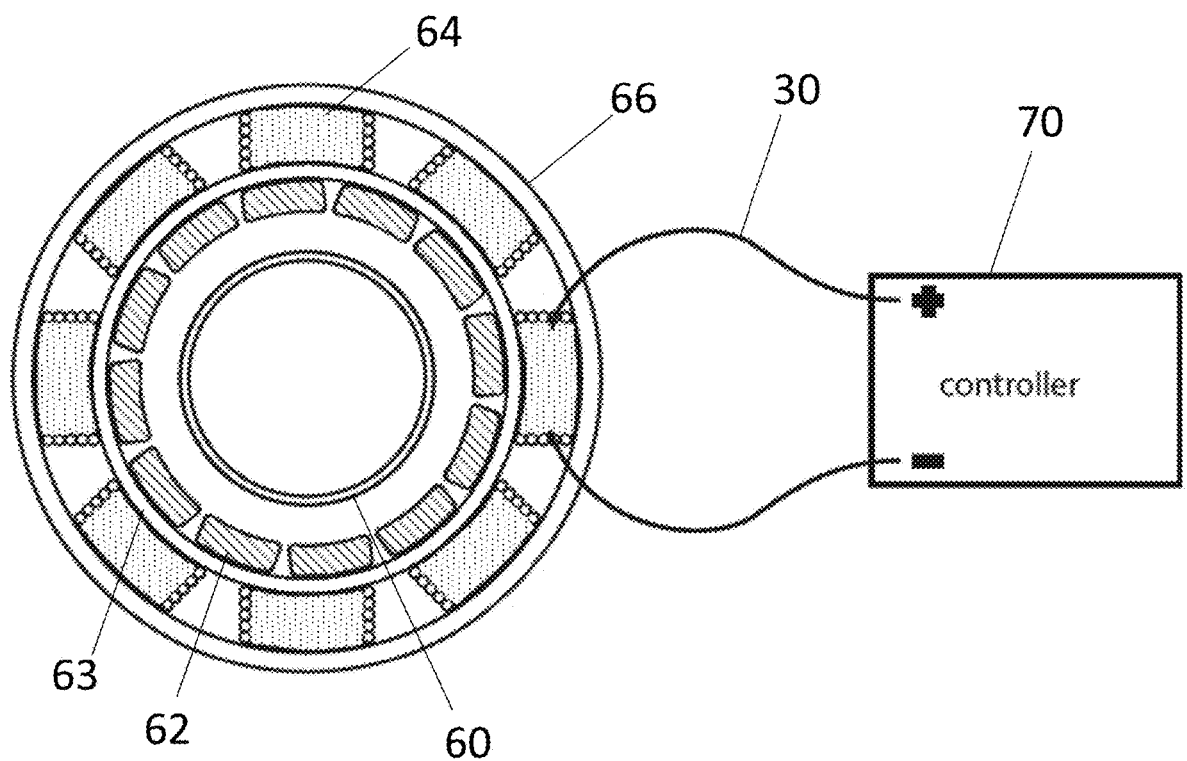
FIG. 5 illustrates a top sectional view of an electromagnetic valve according to one embodiment of the present invention.

FIG. 5 illustrates a top sectional view of an electromagnetic valve according to one embodiment of the present invention. A controller 70 with lead wires 30 is attached to a magnetic actuator for a valve. The magnetic actuator includes one or more permanent magnets 62 surrounding and attached to a rotatable shaft 60. In one embodiment, the one or more permanent magnets 62 include a plurality of individual permanent magnets 62 circumferentially spaced out and attached around the rotatable shaft 60. In another embodiment, the one or more permanent magnets 62 includes a single ring magnet surrounding the full circumference of the rotatable shaft 60 and having alternating poles circumferentially around the rotatable shaft 60. In another embodiment, the one or more permanent magnets 62 includes at least one magnetic array circumferentially surrounding a portion of the rotatable shaft 60. The rotatable shaft 60 and the one or more permanent magnets 62 are sealed within an enclosed cylindrical compartment 63. The enclosed cylindrical compartment 63 is surrounding by one or more electromagnets 64. In one embodiment, the system includes a plurality of electromagnets spaced out around the exterior of the enclosed cylindrical compartment 63, with each of the plurality of electromagnets 64 able to be individually activated by the controller 70 through the lead wires 30. In another embodiment, the system includes one or more electromagnets 64 wrapped around the exterior of the enclosed cylindrical compartment 63, where individual segments of each of the one or more electromagnets 64 are selectively able to be activated. Preferably, the one or more electromagnets 64 or segments of the one or more electromagnets 64 are able to be sequentially, circumferentially activated, allowing the magnetic field generated by the electromagnets 64 to rotate (without physical rotation of the one or more electromagnets 64) and induce a rotational force on the plurality of permanent magnets 62, thereby causing the rotatable shaft 60 to rotate.

Optionally, the one or more electromagnets 64 are surrounded by an external cylindrical compartment 66. In one embodiment, the one or more electromagnets 64 are attached to an interior surface of the external cylindrical compartment 66. In another embodiment, the one or more electromagnets 64 are attached to an exterior surface of the enclosed cylindrical compartment 63. In yet another embodiment, the one or more electromagnets 64 are not attached to either the interior surface of the external cylindrical compartment 66, nor the exterior surface of the enclosed cylindrical compartment 63, but fitted and held by the fit between the enclosed cylindrical compartment 63 and the external cylindrical compartment 66.

Figure 6:
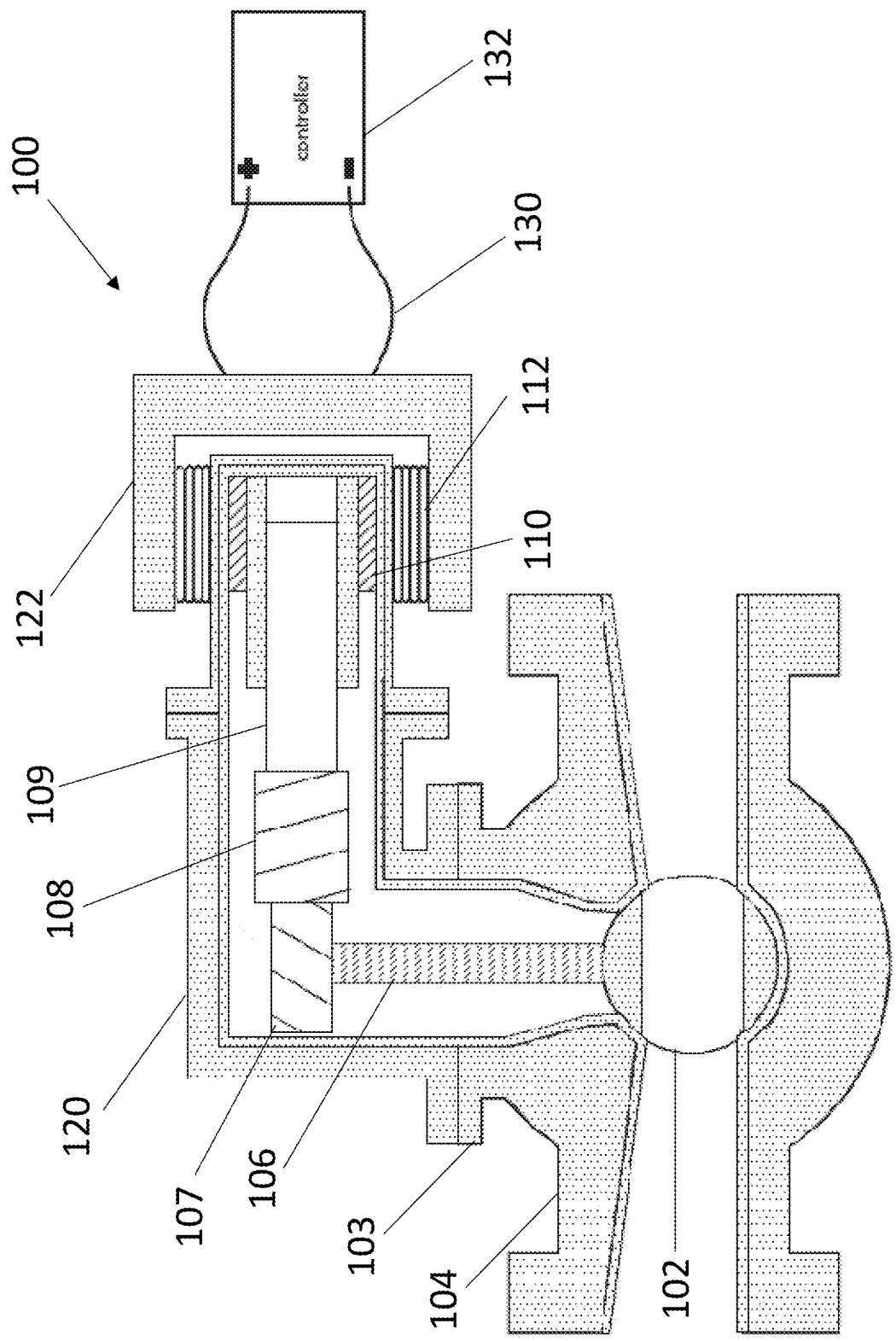
FIG. 6 illustrates a side sectional view of an electromagnetic valve including a worm drive and a quarter-turn valve according to one embodiment of the present invention.

FIG. 6 illustrates a side sectional view of an electromagnetic valve including a worm drive according to one embodiment of the present invention. The electromagnetic valve 100 includes a ball component 102 including a central passage positioning within a pipe 104. When the ball component 102 is in an open position, the central passage of the ball component 102 is aligned with the direction of flow within the pipe 104, allowing fluid to freely flow through the ball component 102. However, when the ball component 102 is turned by approximately 90°, then side walls of the ball component 102 block the flow of fluid through the pipe 104. The ball component 102 is connected to a first shaft 106 and coupled with the first shaft 106, such that rotation of the first shaft 106 causes rotation of the ball component 102. One of ordinary skill in the art will understand that, in one embodiment, the valve does not necessarily exist in only a purely open or a purely closed position, and is also able to exist in one or more different semi-open states between a fully open state and a fully closed state. For example, in one or more different semi-open states, the ball component is not oriented at 90 degrees nor 0 degrees relative to the pipe flow, but rather at an angle between 0 and 90. Therefore, the state of the valve is able to be continuous, rather than discrete.

The top of the first shaft 106 is connected and coupled with a first gear 107 such that rotation of the first gear 107 causes rotation of the first shaft 106. Teeth of the first gear 107 are intermeshed with teeth of a worm gear 108. The worm gear 108, in turn, is connected with and rotationally coupled with a second shaft 109 such that rotation of the second shaft 109 causes rotation of the worm gear 108. In this embodiment, the long axis of the second shaft 109 is substantially orthogonal to the long axis of the first shaft 106. Therefore, as the second shaft 109 rotates, the worm gear 108 rotates. Rotation of the worm gear 108 causes the first gear 107 to rotate in an orthogonal plane due to the intermeshed teeth of the gears. Rotation of the first gear 107 then causes the first shaft 106 to rotate, thereby rotating the ball component 102 and causing the valve mechanism to open or close. An end of the second shaft 109 opposite the worm gear 108 is attached to one or more permanent magnets 110 surrounding the circumference of a section of the second shaft 109.

Each of the first shaft 106, the first gear 107, the worm gear 108, the second shaft 109, and the one or more permanent magnets 110 are contained within the valve housing 120. The valve housing 120 is attached directly to a base plate 103 of the pipe 104 via nuts and bolts, screws, adhesive, welding, latches, and/or any other conventional means of attachment.

A section of the valve housing 120 surrounding the second shaft 109 and, more specifically, the one or more permanent magnets 110 (i.e., a magnetic containment chamber of the valve housing 120) is surrounded by a magnetic housing 122 including at least one electromagnet 112. The at least one electromagnet 112 is connected to at least one wire 130 to a controller 132 operable to activate or deactivate the at least one electromagnet 112. Activation of the at least one electromagnet 112 causes current to move through the at least one electromagnet 112 in a manner that radially shifts the magnetic pole across a portion of or the entire circumference of the magnetic housing 122. This shifting magnetic pole generates a magnetic force acting upon the one or more permanent magnets 110, inducing the one or more permanent magnets 110 to move, thereby causing the second shaft 109 to rotate. Importantly, this allows the system to rotate the second shaft and therefore actuate the valve without any parts rotating or moving outside of the pressure vessel of the valve housing 120, thereby reducing the chance of a spark.

In one embodiment, the magnetic containment chamber of the valve housing 120 is formed from at least one substantially non-ferromagnetic material (e.g., stainless steel, thermoplastic materials, titanium, etc.). Utilizing a non-ferromagnetic material between the outer electromagnet 112 and the inner permanent magnets 110 helps strengthen the magnetic connection between the two components and allows for greater torque to be applied.

Figure 7:
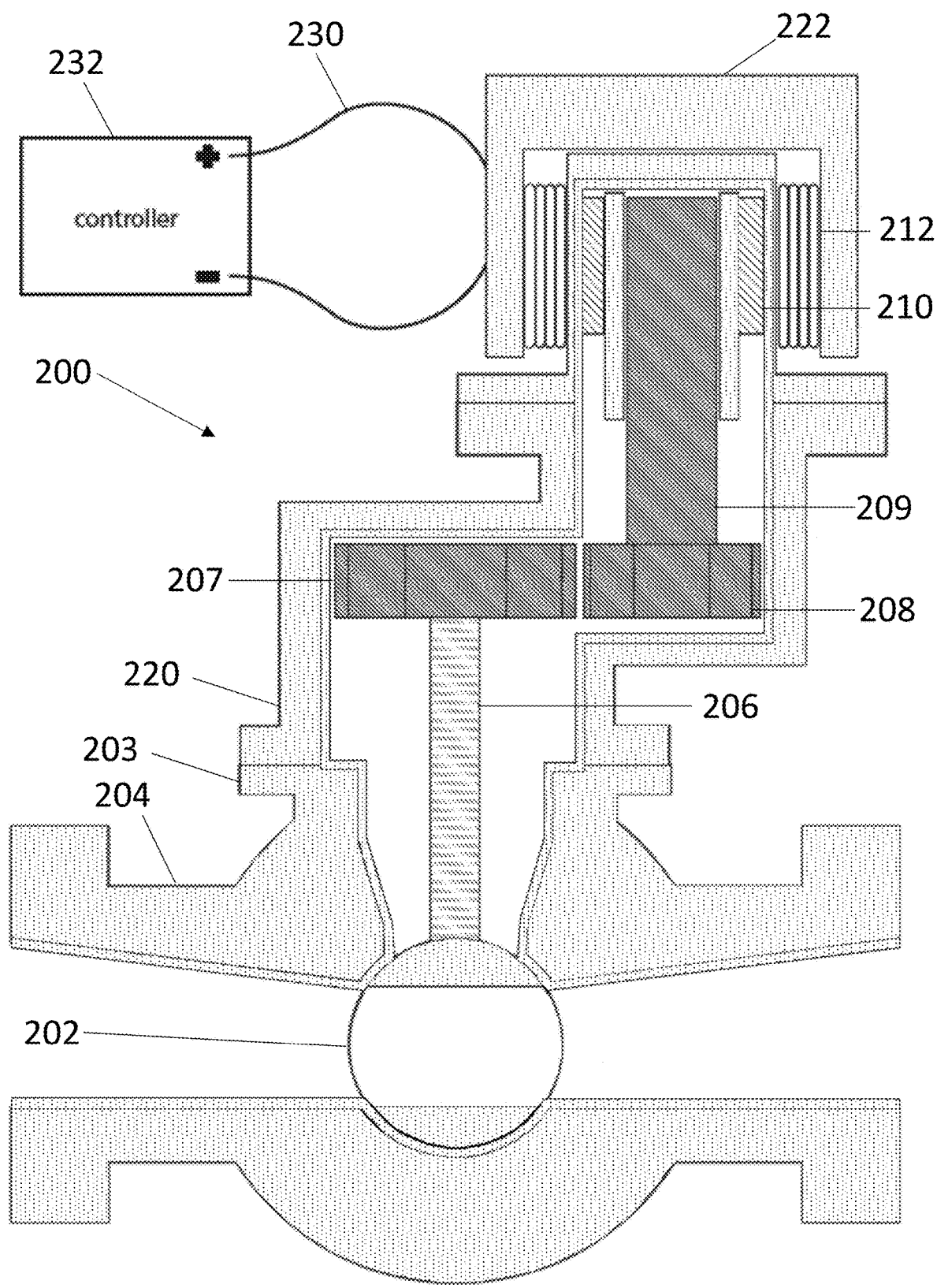
FIG. 7 illustrates a side sectional view of an electromagnetic valve including a parallel shaft gear mechanism and a quarter-turn valve according to one embodiment of the present invention.

FIG. 7 illustrates a side sectional view of an electromagnetic valve including a parallel shaft gear mechanism and a quarter-turn valve according to one embodiment of the present invention. The electromagnetic valve 200 includes a ball component 202 including a central passage positioning within a pipe 204. When the ball component 202 is in an open position, the central passage of the ball component 202 is aligned with the direction of flow within the pipe 204, allowing fluid to freely flow through the ball component 202. However, when the ball component 202 is turned by approximately 90°, then side walls of the ball component 202 block the flow of fluid through the pipe 204. The ball component 202 is connected to a first shaft 206 and coupled with the first shaft 206, such that rotation of the first shaft 206 causes rotation of the ball component 202.

The top of the first shaft 206 is connected and coupled with a first gear 207 such that rotation of the first gear 207 causes rotation of the first shaft 206. Teeth of the first gear 207 are intermeshed with teeth of a second gear 208. The second gear 208, in turn, is connected with and rotationally coupled with a second shaft 209 such that rotation of the second shaft 209 causes rotation of the second gear 208. In this embodiment, the long axis of the second shaft 209 is substantially parallel to the long axis of the first shaft 206. Therefore, as the second shaft 209 rotates, the second gear 208 rotates. Rotation of the second gear 208 causes the first gear 207 to rotate in the same direction due to the intermeshed teeth of the gears. Rotation of the first gear 207 then causes the first shaft 206 to rotate, thereby rotating the ball component 202 and causing the valve mechanism to open or close. An end of the second shaft 209 opposite the second gear 208 is attached to one or more permanent magnets 210 surrounding the circumference of a section of the second shaft 209.

Each of the first shaft 206, the first gear 207, the second gear 208, the second shaft 209, and the one or more permanent magnets 210 are contained within the valve housing 220. The valve housing 220 is attached directly to a base plate 203 of the pipe 204 via nuts and bolts, screws, adhesive, welding, latches, and/or any other conventional means of attachment.

A section of the valve housing 220 surrounding the second shaft 209 and, more specifically, the one or more permanent magnets 210 is surrounded by a magnetic housing 222 including at least one electromagnet 212. The at least one electromagnet 212 is connected to at least one wire 230 to a controller 232 operable to activate or deactivate the at least one electromagnet 212. Activation of the at least one electromagnet 212 causes current to move through the at least one electromagnet 212 in a manner that radially shifts the magnetic pole across a portion of or the entire circumference of the magnetic housing 222. This shifting magnetic pole generates a magnetic force acting upon the one or more permanent magnets 210, inducing the one or more permanent magnets 210 to move, thereby causing the second shaft 209 to rotate. Importantly, this allows the system to rotate the second shaft and therefore actuate the valve without any parts rotating or moving outside of the pressure vessel of the valve housing 220, thereby reducing the chance of a spark.

One of ordinary skill in the art will understand that FIGS. 6-7 are meant to be illustrative of types of valve systems wherein the electromagnetic actuator of the present invention is able to utilized. Other valve component combinations are also able to be used. For example, the electromagnetic actuator is operable to be used in a system with a planetary gear mechanism, such as is described in U.S. Pat. No. 8,496,228.

Figure 8:
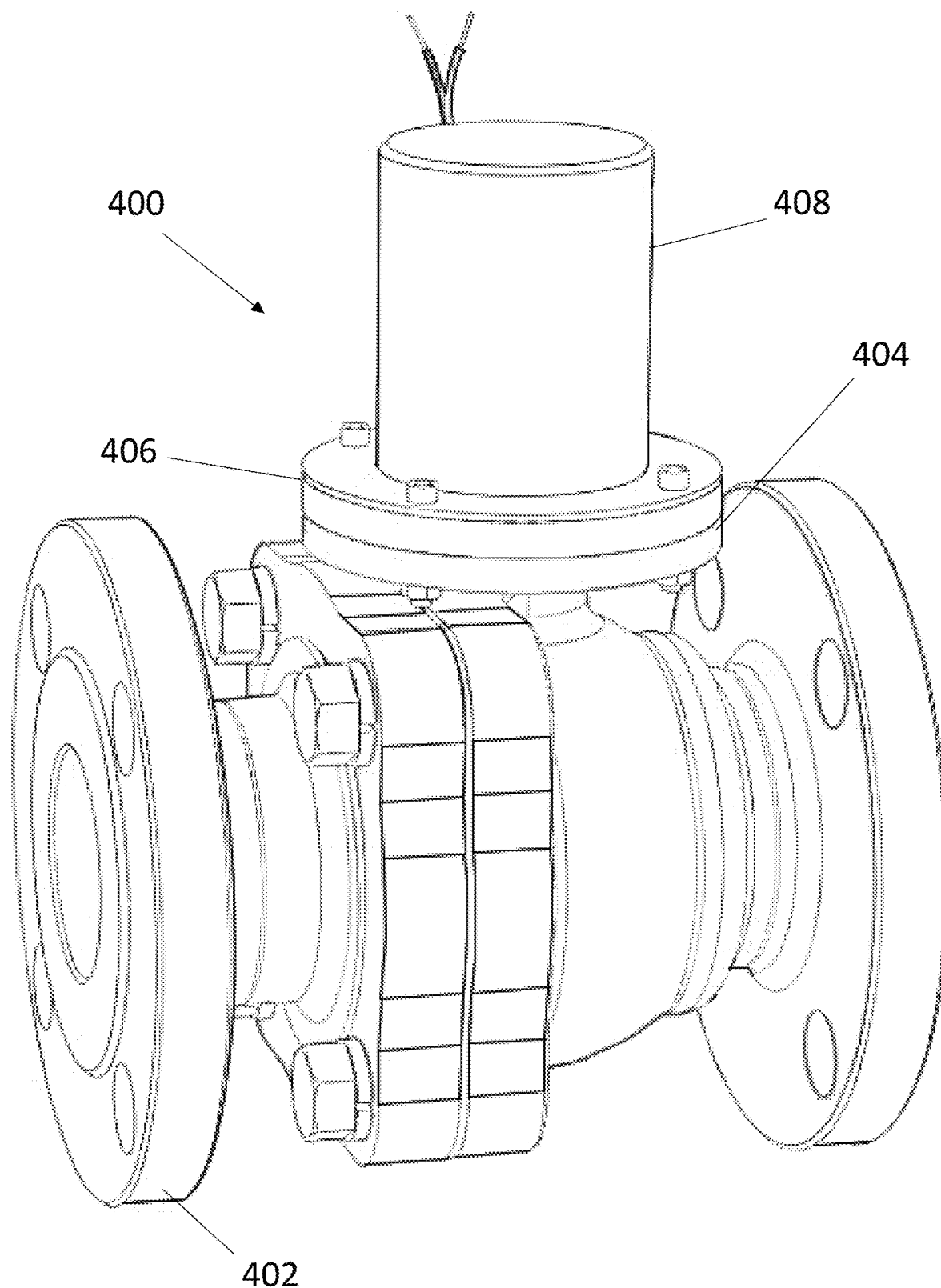
FIG. 8 illustrates a perspective view of an electromagnetic valve according to one embodiment of the present invention.
Figure 9:
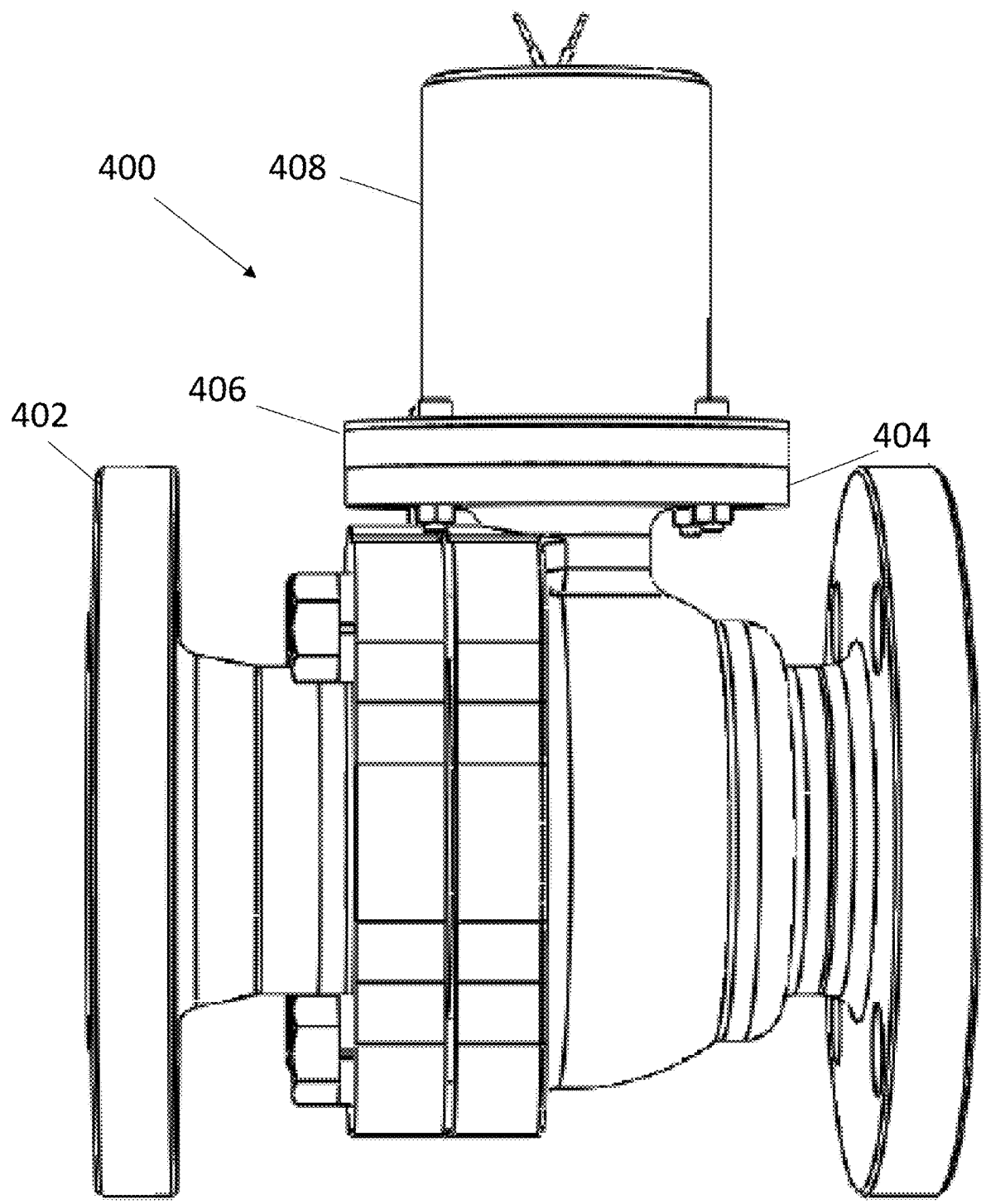
FIG. 9 illustrates an orthogonal side view of an electromagnetic valve according to one embodiment of the present invention.

FIGS. 8-9 illustrate an electromagnetic valve according to one embodiment of the present invention. A pipe 402 carrying fluid includes at least one top plate 404 extending outwardly from the pipe 402. The at least one top plate 404 is attached to a base plate 406 of an electromagnetic valve mechanism. In one embodiment, the at least one top plate 404 and the base plate 406 are attached via nuts and bolts, but one of ordinary skill in the art will understand that the plates are able to be attached by any conventional means, including but not limited to screws, adhesive, and/or welding. The electromagnetic valve mechanism includes a magnetic housing 408 including one or more electromagnets configured to activate the electromagnetic valve mechanism, thereby opening or closing the valve 400.

Figure 10:
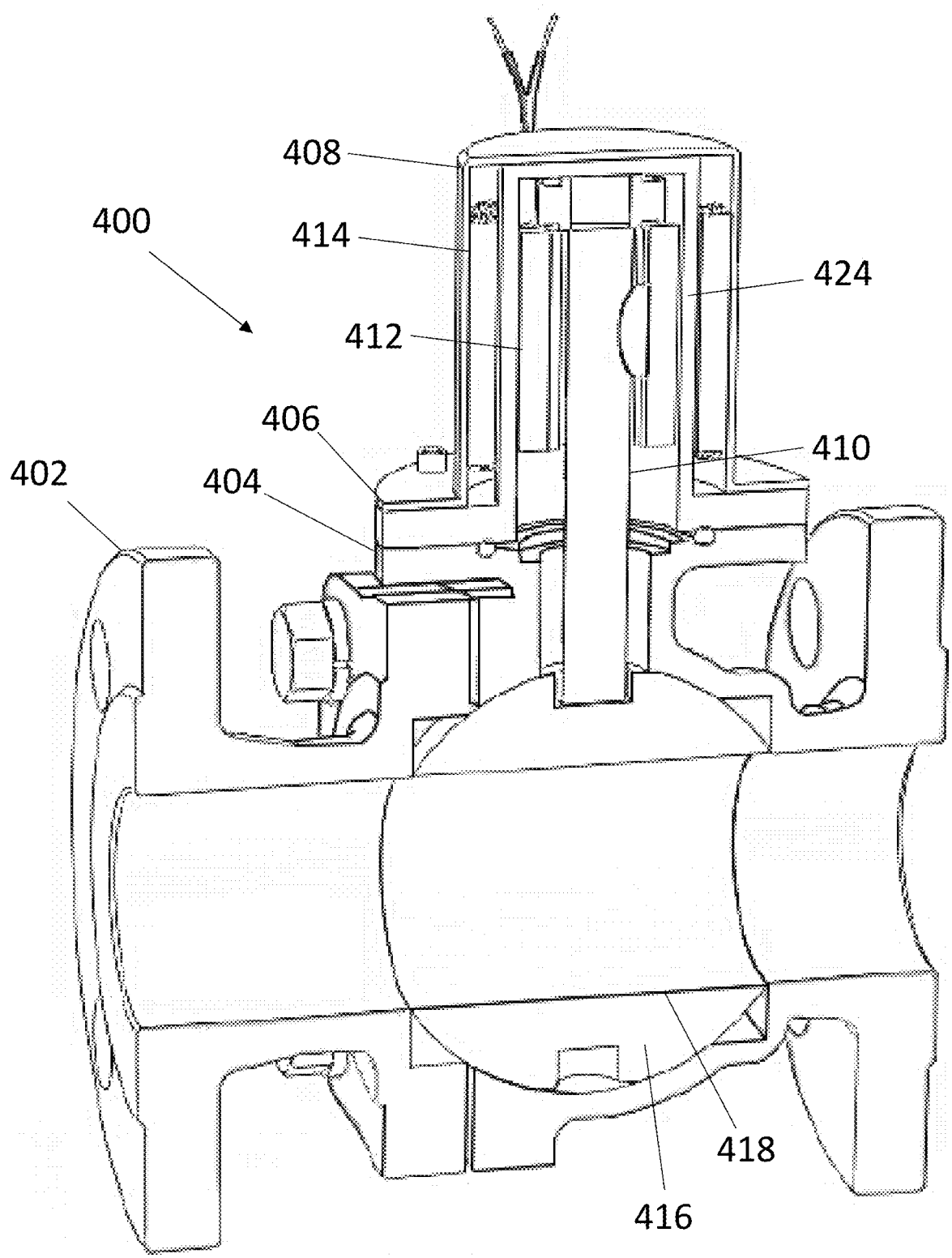
FIG. 10 illustrates a perspective sectional view of an electromagnetic valve according to one embodiment of the present invention.

FIG. 10 illustrates a perspective sectional view of an electromagnetic valve according to one embodiment of the present invention. In one embodiment, the magnetic housing 408 is a hollow cylinder (or otherwise shaped) open to one side that circumferentially surrounds a stem encasement chamber 424. The magnetic housing 408 includes at least one electromagnet 414 positioned between an inner wall of the magnetic housing 408 and an outer wall of the stem encasement chamber 424. The at least one electromagnet 414 is directly attached (e.g., via adhesive, screws, bolts, welding, etc.) to the inner wall of the magnetic housing 408 and/or is directly attached to the outer wall of the stem encasement chamber 424 (e.g., via adhesive, screws, bolts, welding, etc.). In another embodiment, the electromagnet 414 is held in place through contact with both the magnetic housing 408 and the stem encasement chamber 424. In one embodiment, the magnetic housing 408 is not used and the at least one electromagnet 414 is exposed and attached to the stem encasement chamber 424. In one embodiment, a gear attached to one or more permanent magnets 412 surrounds a section of a stem 410 within the stem encasement chamber 424. The gear is in tight frictional engagement with the stem 410, such that the two components are rotationally coupled (i.e., rotation of the gear directly causes rotation of the stem 410).

The stem 410 is attached to a ball 416 (or otherwise shaped component) with a central opening 418 extending through the ball in a single direction. In a closed state, the opening 418 in the ball 416 does not align with the lumen of the pipe 402, while, in an open state, the opening 418 in the ball 416 aligns with the lumen of the pipe 402, allowing fluid to flow. The stem 410 and the ball 416 are rotationally coupled such that rotation of the stem 410 causes rotation of the ball 416. Therefore, rotation of the stem 410 causes the valve 400 to move between an open state and a closed state.

Figure 11:
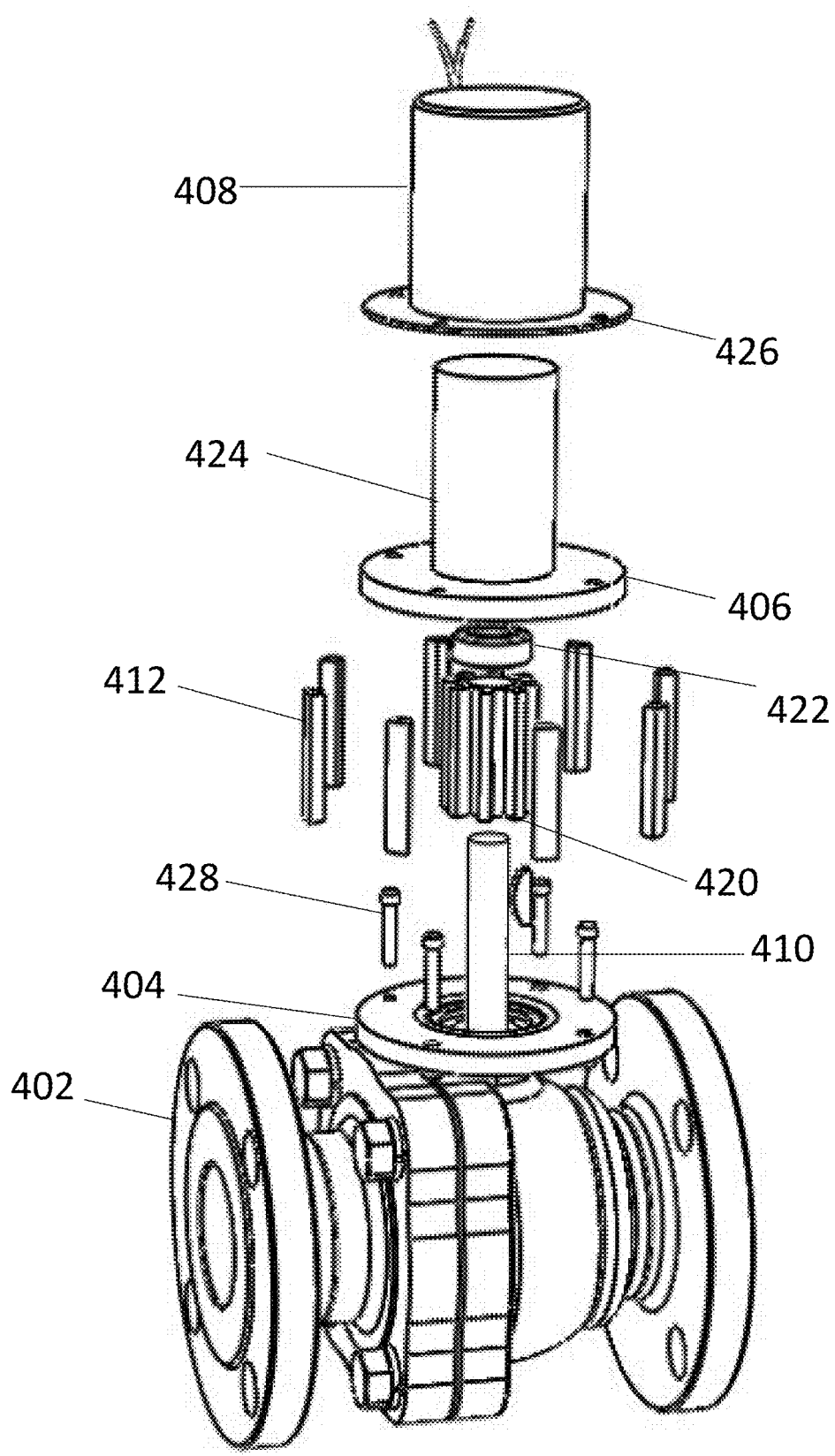
FIG. 11 illustrates an exploded view of an electromagnetic valve according to one embodiment of the present invention.
Figure 12:
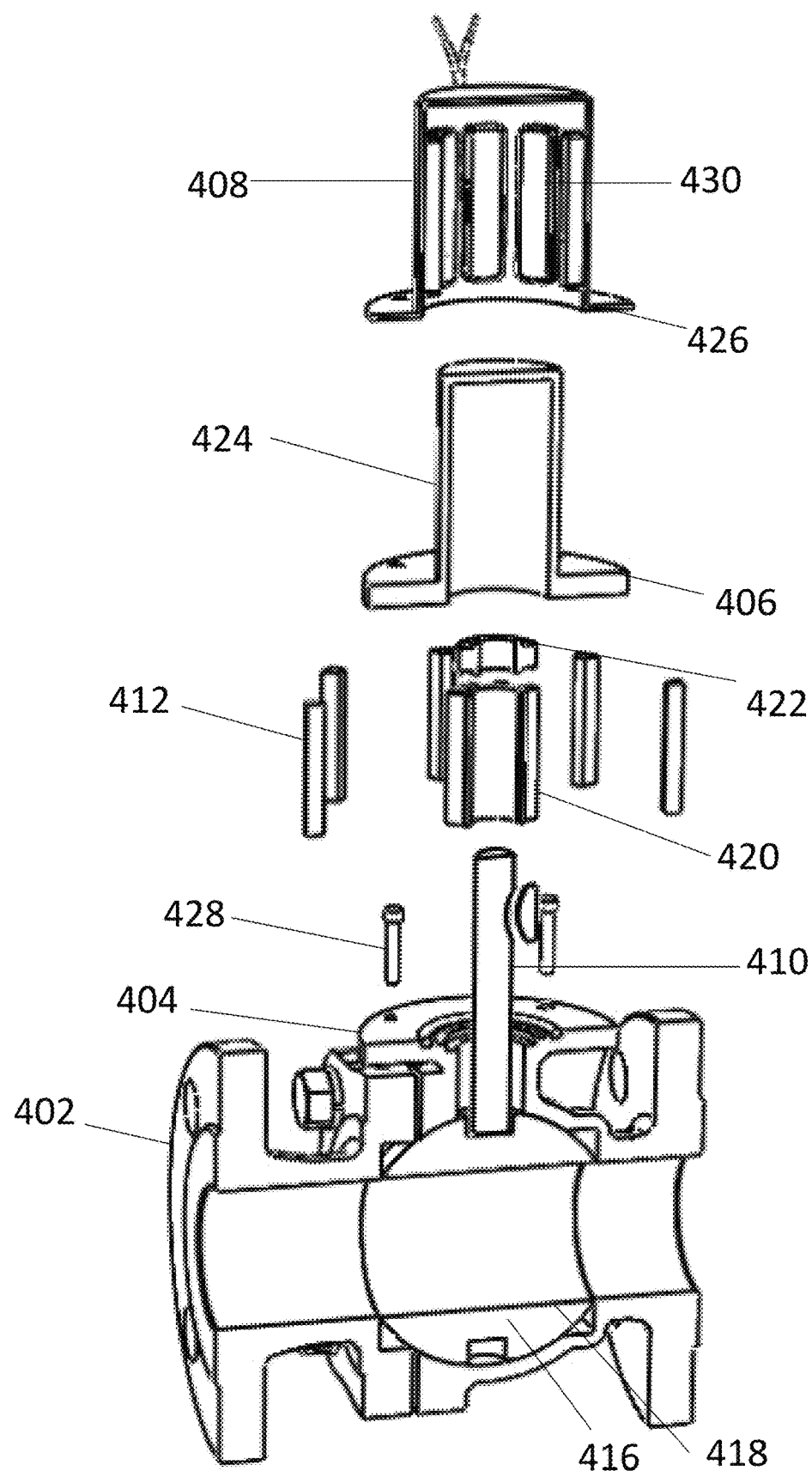
FIG. 12 illustrates an exploded sectional view of an electromagnetic valve according to one embodiment of the present invention.

FIGS. 11-12 illustrate exploded views of an electromagnetic valve according to one embodiment of the present invention. A pipe 402 includes a top plate 404 with a stem 410 of a valve mechanism extending through the top plate 404. A stem encasement chamber 424 includes a cylindrical section attached to a base plate 406. In one embodiment, the base plate 407 is configured to attach to the top plate 404 via a plurality of bolts and/or screws, and/or via adhesive and/or welding. In one embodiment, the magnetic housing 408 also includes a cylindrical section attached to a base plate 426. The cylindrical section of the magnetic housing 408 is configured to surround the cylindrical section of the stem encasement chamber 424, while the base plate 426 of the magnetic housing 408 lies on top of the base plate 406 of the stem encasement chamber 424. In one embodiment, the base plate 426 of the magnetic housing 408 includes one or more openings configured to align with one or more openings in the base plate 406 of the stem encasement chamber 424 and one or more openings in the top plate 404 to receive bolts 428 and/or screws and to thereby attached and seal all three components.

Within the stem encasement chamber 424, a section of the stem 410 is surrounded by and frictionally engaged with at least one gear 420. In one embodiment, the at least one gear 420 is attached to a plurality of permanent magnets 412, such that magnetic force applied to the plurality of permanent magnets 412 causes the at least one gear 420 to turn, thereby causing the stem 410 to turn and open or close the valve. In one embodiment, the at least one gear 420 includes a plurality of teeth extending outwardly from a side wall of the at least one gear 420. In this embodiment, the permanent magnets 412 are wedge shaped components configured to fit between each of the teeth of the at least one gear 420 such that the at least one gear 420 and the permanent magnets 412 are substantially cylindrical in shape. In one embodiment, a washer 422 fits around the stem 410 and lies on top of the at least one gear 420.

Figure 13:
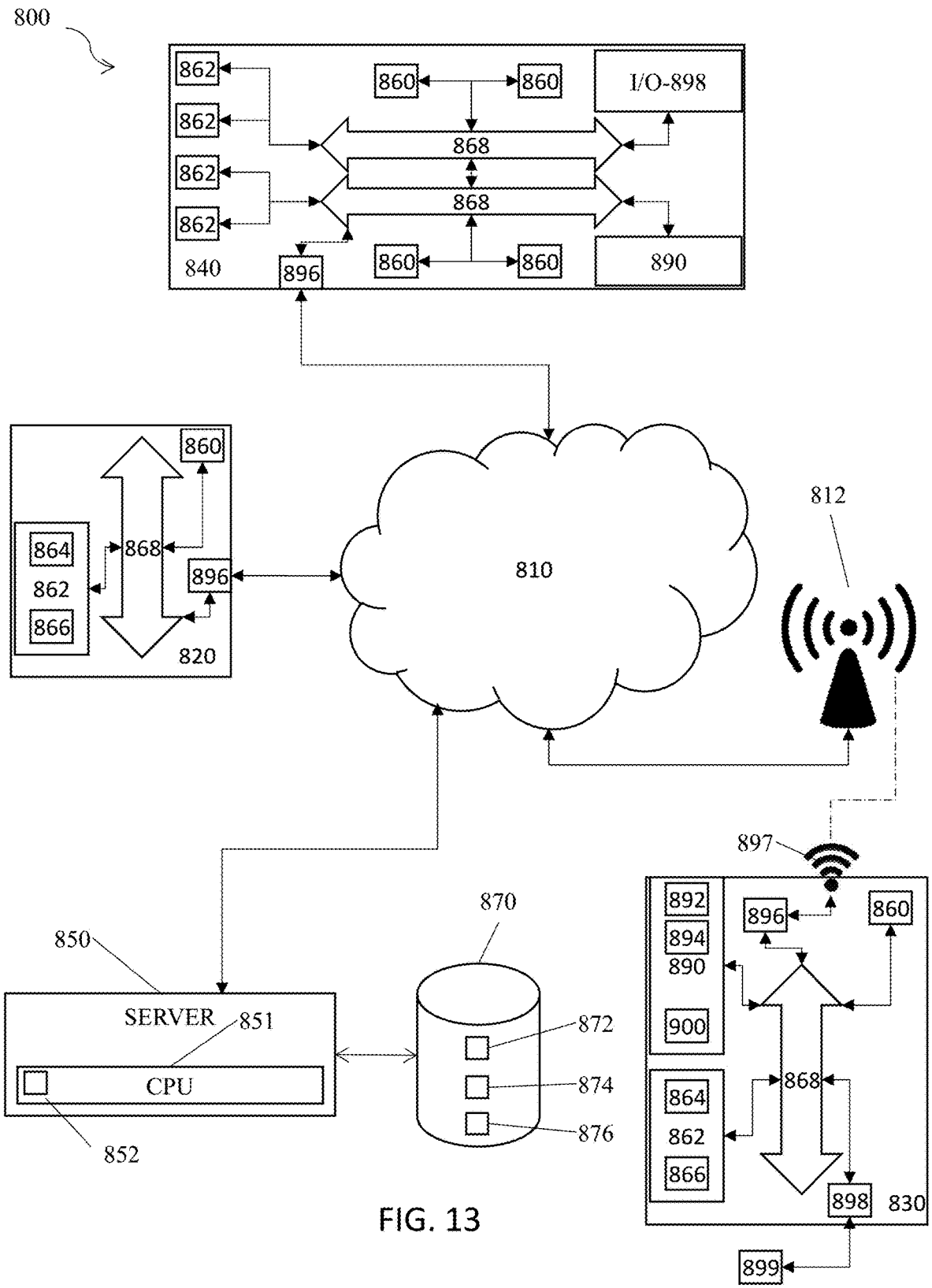
FIG. 13 is a schematic diagram of a system of the present invention.

FIG. 13 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 13, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 13, is operable to include other components that are not explicitly shown in FIG. 13, or is operable to utilize an architecture completely different than that shown in FIG. 13. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. An electromagnetically actuated valve system, comprising:
   at least one valve blocking mechanism positioned within an oil or natural gas pipeline, wherein, in an open position, the at least one valve blocking mechanism substantially allows fluid flow through the oil or natural gas pipeline, and wherein, in a closed position, the at least one valve blocking mechanism substantially prohibits fluid through the oil or natural gas pipeline;
   at least one rotary shaft mechanically coupled with the at least one valve blocking mechanism, such that rotation of the at least one rotary shaft causes the at least one valve blocking mechanism to change between the open position, the closed position, and one or more semi-open positions between the open position and the closed position;
   a plurality of permanent magnets attached to at least one end of the at least one rotary shaft;
   wherein the plurality of permanent magnets includes at least one radially symmetric array;
   a valve housing sealingly enclosing the at least one valve blocking mechanism, the at least one rotary shaft, and the plurality of permanent magnets, wherein the valve housing includes at least one magnetic containment chamber surrounding the plurality of permanent magnets;
   wherein the plurality of permanent magnets are embedded in cavities formed between teeth of at least one gear within the at least one magnetic containment chamber, wherein the at least one gear surrounds and is in contact with the at least one rotary shaft;
   at least one electromagnet connected to an external surface of the at least one magnetic containment chamber; and
   a controller electrically connected to the at least one electromagnet;
   wherein the valve housing and the at least one magnetic containment chamber define a pressure vessel of the valve system;
   wherein the at least one electromagnet does not substantially rotate relative to the at least one magnetic containment chamber during actuation of the electromagnetically actuated valve system;
   wherein the controller alternates the at least one valve blocking mechanism between the open position, the closed position, and the one or more semi-open positions by activating the at least one electromagnet; and
   wherein the controller is operable to receive commands through a wireless network.

2. The system of claim 1, wherein a first end of the at least one rotary shaft is attached to a first gear, wherein the first gear is enmeshed with a second gear attached to at least one secondary rotary shaft, and wherein the at least one secondary rotary shaft is attached to the at least one valve blocking mechanism.

3. The system of claim 1, wherein the at least one valve blocking mechanism is a quarter turn valve mechanism, or a rising stem valve mechanism.

4. The system of claim 1, wherein the at least one electromagnet includes a plurality of electromagnets, and wherein the controller alternates the at least one valve blocking mechanism between the open position and the closed position by sequentially activating one or more of the plurality of electromagnets.

5. The system of claim 1, wherein the at least one magnetic containment chamber is formed from at least one substantially non-ferromagnetic material.

6. The system of claim 1, wherein the at least one magnetic containment chamber is formed from stainless steel, titanium, and/or a thermoplastic material.

7. The system of claim 1, wherein an outer magnetic housing surrounds the at least one electromagnet.

8. An electromagnetically actuated valve system, comprising:
   at least one valve blocking mechanism positioned within an oil or natural gas pipeline, wherein, in an open position, the at least one valve blocking mechanism substantially allows fluid flow through the oil or natural gas pipeline, and wherein, in a closed position, the at least one valve blocking mechanism substantially prohibits fluid through the oil or natural gas pipeline;
   at least one rotary shaft mechanically coupled with the at least one valve blocking mechanism, such that rotation of the at least one rotary shaft causes the at least one valve blocking mechanism to change between the open position, the closed position, and one or more semi-open positions between the open position and the closed position;
   a plurality of permanent magnets attached to at least one end of the at least one rotary shaft;
   wherein the plurality of permanent magnets includes at least one radially symmetric array;
   at least one magnetic containment chamber surrounding the at least one rotary shaft and the one or more permanent magnets attached to the at least one rotary shaft;
   wherein the plurality of permanent magnets are embedded in cavities formed between teeth of at least one gear within the at least one magnetic containment chamber, wherein the at least one gear surrounds and is in contact with the at least one rotary shaft;
   at least one electromagnet connected to an external surface of the at least one magnetic containment chamber; and
   a controller electrically connected to the at least one electromagnet;
   wherein the at least one magnetic containment chamber defines a pressure vessel of the valve system;
   wherein the controller alternates the at least one valve blocking mechanism between the open position, the closed position, and the one or more semi-open positions by activating the at least one electromagnet;
   wherein the controller alternates the at least one valve blocking mechanism between the open position and the closed position by sequentially activating one or more of the at least one electromagnet or by sequentially activating a plurality of sections of the at least one electromagnet;
   wherein the at least one magnetic containment chamber is formed from at least one substantially non-ferromagnetic material.

9. The system of claim 8, wherein a first end of the at least one rotary shaft is attached to a first gear, wherein the first gear is enmeshed with a second gear attached to at least one secondary rotary shaft, and wherein the at least one secondary rotary shaft is attached to the at least one valve blocking mechanism.

10. The system of claim 8, wherein the at least one valve blocking mechanism is a quarter turn valve mechanism, or a rising stem valve mechanism.

11. The system of claim 8, wherein the at least one electromagnet includes a plurality of electromagnets.

12. The system of claim 8, wherein the at least one magnetic containment chamber is formed of stainless steel.

13. The system of claim 8, wherein an outer magnetic housing surrounds the at least one electromagnet.

14. An electromagnetically actuated valve system, comprising:
- at least one valve blocking mechanism positioned within an oil or natural gas pipeline, wherein, in an open position, the at least one valve blocking mechanism substantially allows fluid flow through the oil or natural gas pipeline, and wherein, in a closed position, the at least one valve blocking mechanism substantially prohibits fluid through the oil or natural gas pipeline;
- at least one rotary shaft mechanically coupled with the at least one valve blocking mechanism, such that rotation of the at least one rotary shaft causes the at least one valve blocking mechanism to change between the open position, the closed position, and one or more semi-open positions between the open position and the closed position;
- a plurality of permanent magnets attached to at least one end of the at least one rotary shaft;
- wherein the plurality of permanent magnets includes at least one radially symmetric array;
- at least one magnetic containment chamber surrounding the at least one rotary shaft and the one or more permanent magnets attached to the at least one rotary shaft;
- wherein the plurality of permanent magnets are embedded in cavities formed between teeth of at least one gear within the at least one magnetic containment chamber, wherein the at least one gear surrounds and is in contact with the at least one rotary shaft;
- a plurality of electromagnets connected to an external surface of the at least one magnetic containment chamber; and
- a controller electrically connected to the plurality of electromagnets;
- wherein the at least one magnetic containment chamber defines a pressure vessel of the valve system; and
- wherein the controller alternates the at least one valve blocking mechanism between the open position, the closed position, and the one or more semi-open positions by activating the at least one electromagnet by sequentially activating one or more of the plurality of electromagnets.

15. The system of claim 14, wherein a first end of the at least one rotary shaft is attached to a first gear, wherein the first gear is enmeshed with a second gear attached to at least one secondary rotary shaft, and wherein the at least one secondary rotary shaft is attached to the at least one valve blocking mechanism.

16. The system of claim 14, wherein the at least one valve blocking mechanism is a quarter turn valve mechanism, or a rising stem valve mechanism.

* * * * *